US009291394B2

(12) United States Patent
Lesueur

(10) Patent No.: US 9,291,394 B2
(45) Date of Patent: Mar. 22, 2016

(54) HEATING MODULE, A HEATING SYSTEM INCLUDING A PLURALITY OF HEATING MODULES, AND AN INSTALLATION INCLUDING SUCH A HEATING SYSTEM

(75) Inventor: Didier Lesueur, Bazoches sur Vesles (FR)

(73) Assignee: FINAXO ENVIRONMENT, Fismes (FR)

( * ) Notice: Subject to any disclaimer, the term of this patent is extended or adjusted under 35 U.S.C. 154(b) by 330 days.

(21) Appl. No.: 13/996,258

(22) PCT Filed: Dec. 19, 2011

(86) PCT No.: PCT/FR2011/053044
§ 371 (c)(1),
(2), (4) Date: Jul. 24, 2013

(87) PCT Pub. No.: WO2012/085422
PCT Pub. Date: Jun. 28, 2012

(65) Prior Publication Data

US 2013/0302217 A1 Nov. 14, 2013

(30) Foreign Application Priority Data

Dec. 21, 2010 (FR) ..................................... 10 60943

(51) Int. Cl.

| | |
|---|---|
| ***B01J 7/00*** | (2006.01) |
| ***F27B 14/08*** | (2006.01) |
| ***F23G 5/027*** | (2006.01) |
| ***F23G 5/20*** | (2006.01) |
| ***F27B 14/12*** | (2006.01) |
| ***F27B 19/04*** | (2006.01) |

(Continued)

(52) U.S. Cl.
CPC .......... *F27B 14/0806* (2013.01); *F23G 5/0273* (2013.01); *F23G 5/20* (2013.01); *F27B 14/02* (2013.01); *F27B 14/08* (2013.01); *F27B 14/12* (2013.01); *F27B 19/02* (2013.01); *F27B 19/04* (2013.01); *F23G 2209/281* (2013.01); *F23G 2900/50801* (2013.01)

(58) Field of Classification Search
CPC ...... F27B 14/00; F27B 14/08; F27B 14/0806; F27B 14/0825; F27B 14/0875; F27B 14/0881; F27B 14/10; F27B 14/102; F27B 14/04; F27B 14/106; F27B 14/108; F27B 14/12; F27B 14/14; F27B 14/143
See application file for complete search history.

(56) References Cited

U.S. PATENT DOCUMENTS

| | | | |
|---|---|---|---|
| 3,020,227 | A | 2/1962 | Nevens et al. |
| 3,595,540 | A | 7/1971 | Whitcombe |
| 4,384,947 | A | 5/1983 | Van Zanten |

(Continued)

FOREIGN PATENT DOCUMENTS

| | | | |
|---|---|---|---|
| FR | 2 882 046 | A1 | 8/2006 |

OTHER PUBLICATIONS

Larry J. Ricci, "Spent-tire pyrolysis may add bounce to recycling", Chemical Engineering, Aug. 2, 1976, p. 52, vol. 83, No. 17.

*Primary Examiner* — Imran Akram
(74) *Attorney, Agent, or Firm* — Sughrue Mion, PLLC

(57) ABSTRACT

A heating module for heating solid matter, such as balls, to a determined temperature. The module includes a heating pot including a crucible for receiving the matter to be heated, and a burner for heating the crucible and the matter to be heated; and a cover that is mounted in removable manner on the heating pot so as to close the crucible.

11 Claims, 5 Drawing Sheets

(51) Int. Cl.
*F27B 14/02* (2006.01)
*F27B 19/02* (2006.01)

(56) References Cited

U.S. PATENT DOCUMENTS

| | | | | | |
|---|---|---|---|---|---|
| 4,404,152 | A | | 9/1983 | Pollock | |
| 4,407,653 | A | | 10/1983 | Nutter | |
| 4,605,438 | A | * | 8/1986 | Keith | F27B 14/04 266/216 |
| 4,609,392 | A | * | 9/1986 | Claisse | 65/134.7 |
| 4,944,674 | A | * | 7/1990 | Wedge | F27B 14/00 431/170 |
| 5,599,182 | A | * | 2/1997 | Andrews | C03B 5/12 432/158 |
| 5,810,907 | A | * | 9/1998 | Okada | C22B 21/0084 266/229 |
| 6,042,371 | A | * | 3/2000 | Mitani | F23C 3/00 431/215 |
| 6,549,558 | B1 | * | 4/2003 | Okada | C22B 9/16 373/77 |
| 2003/0097968 | A1 | * | 5/2003 | Minowa | C03B 5/06 110/165 R |
| 2007/0289508 | A1 | * | 12/2007 | Okada | C22B 7/001 110/236 |
| 2009/0130619 | A1 | * | 5/2009 | Okada et al. | 432/158 |
| 2010/0139564 | A1 | * | 6/2010 | Lee | C23C 14/243 118/726 |
| 2011/0124484 | A1 | * | 5/2011 | Maki | C01G 23/002 501/32 |

* cited by examiner

HEATING MODULE, A HEATING SYSTEM INCLUDING A PLURALITY OF HEATING MODULES, AND AN INSTALLATION INCLUDING SUCH A HEATING SYSTEM

CROSS REFERENCE TO RELATED APPLICATIONS

This application is a National Stage of International Application No. PCT/FR2011/053044, filed on Dec. 19, 2011, which claims priority from French Patent Application No. 1060943, filed on Dec. 21, 2010, the contents of all of which are incorporated herein by reference in their entirety.

The present invention relates to a heating module for heating solid matter to a determined temperature. The solid matter may be in the form of balls, granules, and more generally solid bodies of size that is more or less identical. Such a heating module may be incorporated in a heating system that includes a plurality of modules of this type. In particular, such a heating system may be incorporated in an installation for producing pyrolysis gas from organic matter. In addition, the present invention also relates to such a heating system and to such an installation for producing pyrolysis gas. However, the heating module of the present invention may be incorporated in any heating system or installation that needs a heating system or module.

In the iron and steel industry and in the field of foundry, it is already known to transport molten matter in a pot that is mounted to pivot about a horizontal axis so as to be able to empty its contents. Naturally, that is for transporting liquid matter and not for heating solid matter.

In order to heat solid matter, such as balls, to a determined temperature, the present invention provides a heating module comprising:

- a heating pot that includes a crucible for receiving the matter to be heated, and a burner for heating the crucible; and
- a cover that is mounted in removable manner on the heating pot so as to close the crucible.

The aim is not to melt the matter, but merely to heat it to a determined temperature at which it continues to remain in the solid state. In order to increase the temperature inside the crucible rapidly, and avoid emanations of harmful gas, the crucible is surmounted by a cover that makes it possible to create a closed space that is isolated from the outside. The cover is movable relative to the pot, or vice-versa.

In an advantageous embodiment, the crucible is provided with through holes so as to convey the heat from the burner into the crucible and through the matter to be heated. Preferably, the crucible is frustoconical and perforated with a plurality of the through holes. Thus, the heat or the flame from the burner not only heats the crucible from the outside, but penetrates directly inside the crucible and propagates in the gaps present in the matter. As a result, the matter is heated more rapidly and more uniformly since the heat is not transmitted merely by transmission through the crucible, but by direct contact with the matter to be heated.

According to an advantageous additional characteristic, the heating pot further includes a bellows so as to create a flow of air that is heated by the burner and that flows through the through holes of the crucible and through the matter to be heated. The flow of air driven by the bellows enables the heat or the flame of the burner to be driven through the through holes of the crucible in such a manner as to heat the matter directly, and not to heat only the crucible.

In another advantageous aspect of the invention, the cover includes an evacuation duct for evacuating the hot gas from the crucible. Thus, the cover serves not only as a lid for the crucible, but also as an evacuation hood making it possible to recover the hot gas that may possibly be used for some other application.

In a practical embodiment, the heating pot is mounted to pivot about a horizontal axis, and the cover is movable in translation along a vertical axis.

The invention also relates to a heating system for heating matter, said heating system including a plurality of heating modules as defined above, wherein the modules are arranged side by side, the heating pots being mounted to pivot about a common horizontal axis, each heating pot pivoting in independent manner, the heating system further including a loading rail for loading matter, said loading rail being arranged above the pots and being provided with a loading carriage for loading crucibles, and an unloading rail for unloading heated matter, said unloading rail being arranged below the pots and being provided with an unloading carriage for unloading crucibles, the modules and the carriages being actuated in sequential manner so as to deliver the heated matter with a regular sequential flow. When it is balls that are to be heated, each pot receives a defined quantity of balls from the loading carriage and, after a certain period of heating time, delivers the same quantity of heated balls into the unloading carriage. The pots are actuated in sequential and consecutive manner so as to receive and deliver defined quantities of balls that are spaced apart over time but with a regular sequence.

The invention also provides an installation for producing pyrolysis gas from organic matter, said installation comprising:

- a pyrolysis furnace or reactor that operates without oxygen and with preheated balls;
- a heating system as defined above for heating the balls; and
- ball conveyor systems for conveying the heated balls from the heating system to the furnace or reactor, and the cooled balls from the furnace or reactor to the heating system.

Advantageously, the heating system is positioned above the reactor, the conveyor systems including elevators that are provided with buckets that are vertically movable up and down. It can also be said that the pivot axis of the heating pots is parallel to the axis of the furnace. By arranging the heating system above the furnace, the amount of floor space taken up by the installation is minimized in optimum manner.

According to an advantageous characteristic of the invention, the furnace is placed in an airtight chamber that is provided with an organic-matter inlet and a pyrolysis-gas outlet, and with a preheated-balls inlet and a cooled-balls outlet, the balls inlet and/or outlet being fitted with an air lock comprising:

- a stationary cage that is provided with two openings that are arranged in opposite manner, namely a loading top opening and an unloading bottom opening; and
- a rotary drum that is mounted to turn about its axis Y inside the cage, the drum including a window that can be selectively positioned to face one of the openings of the stationary cage so as to load and unload the matter from/into the air lock. The heating module of the present invention and the air locks of the airtight chamber are particularly well suited to heating and conveying balls, e.g. steel balls, in an installation for producing pyrolysis gas from organic matter, e.g. waste such as used tires, sludge, vinasse residue, etc.

The present invention is described more fully below with reference to the accompanying drawings, which show an embodiment and an application of the present invention by way of non-limiting example.

Figure 1:
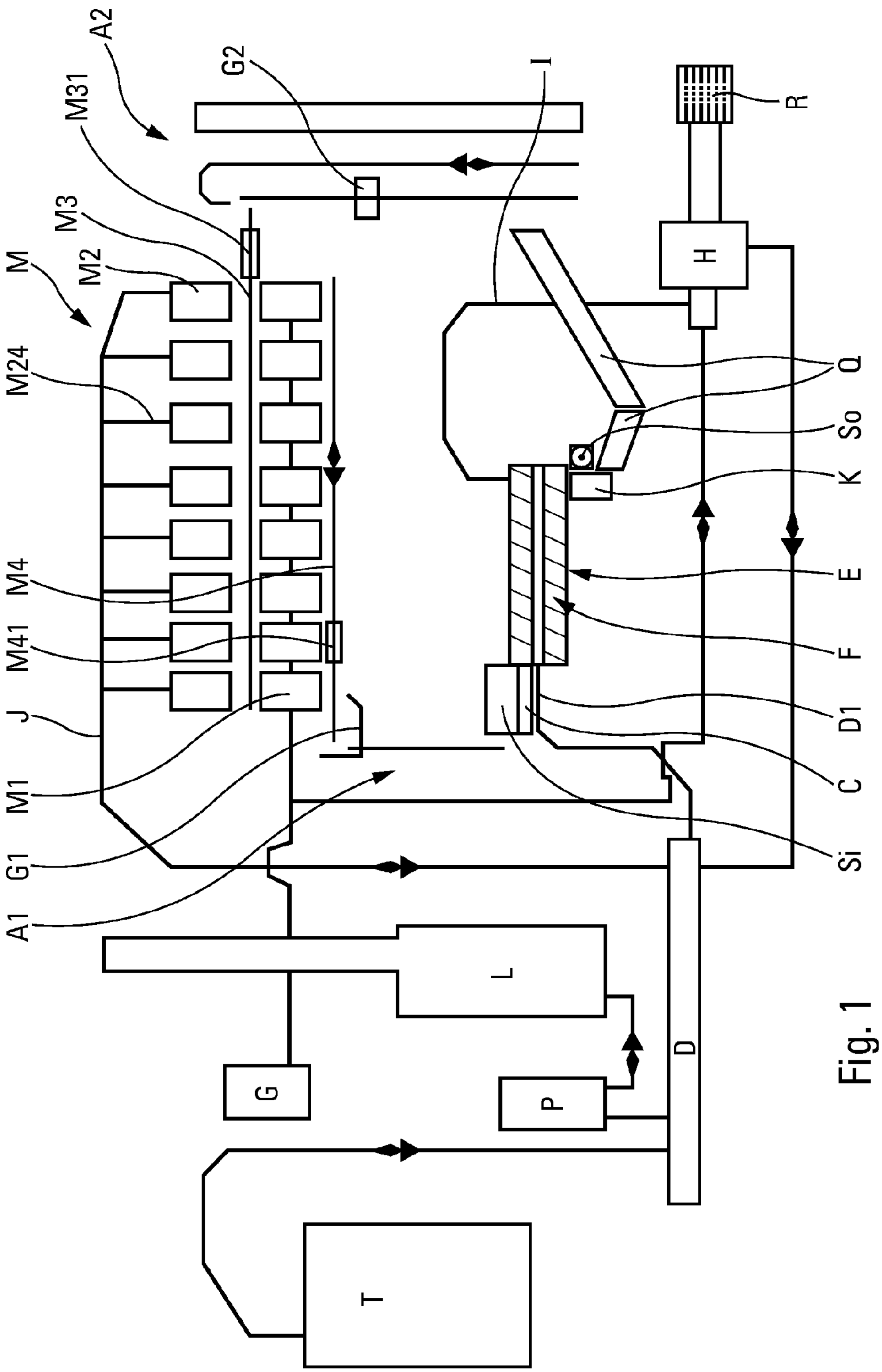
FIG. 1 is an overall diagrammatic view of an installation for producing pyrolysis gas by using the present invention.
Figure 3:
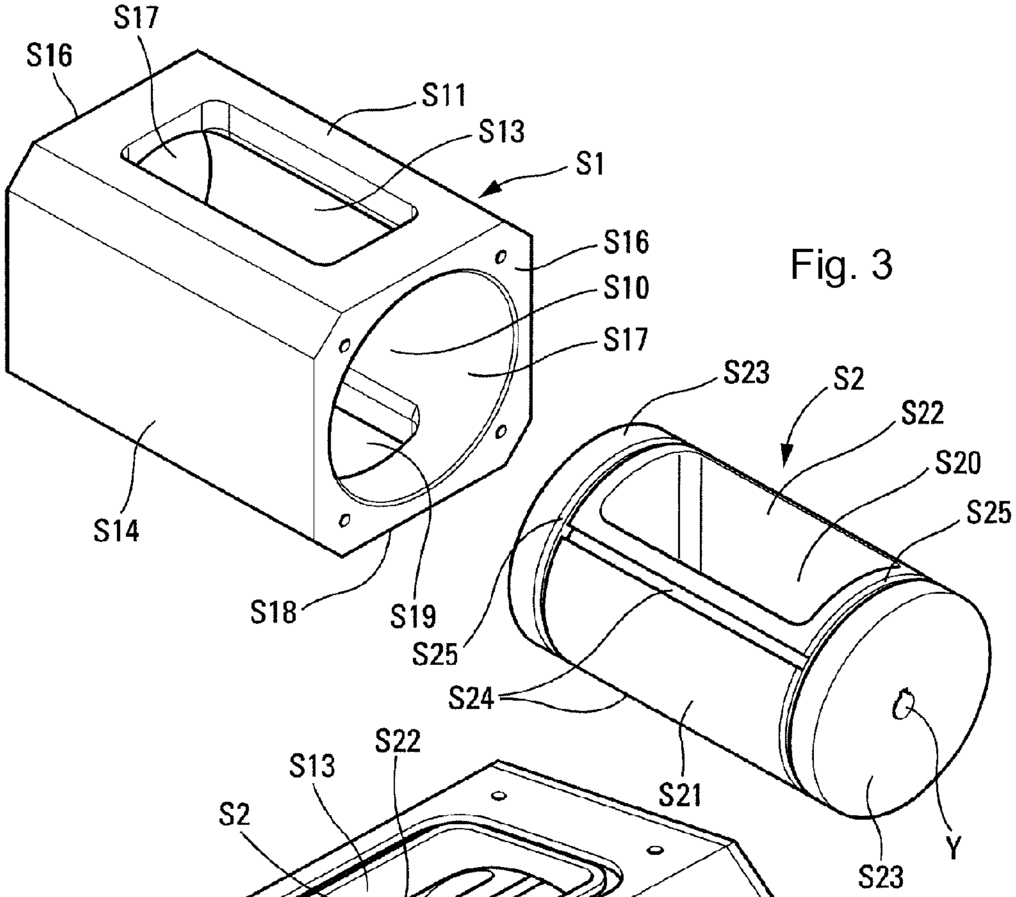
FIG. 3 is an exploded perspective view of an air lock of the present invention.
Figure 4:
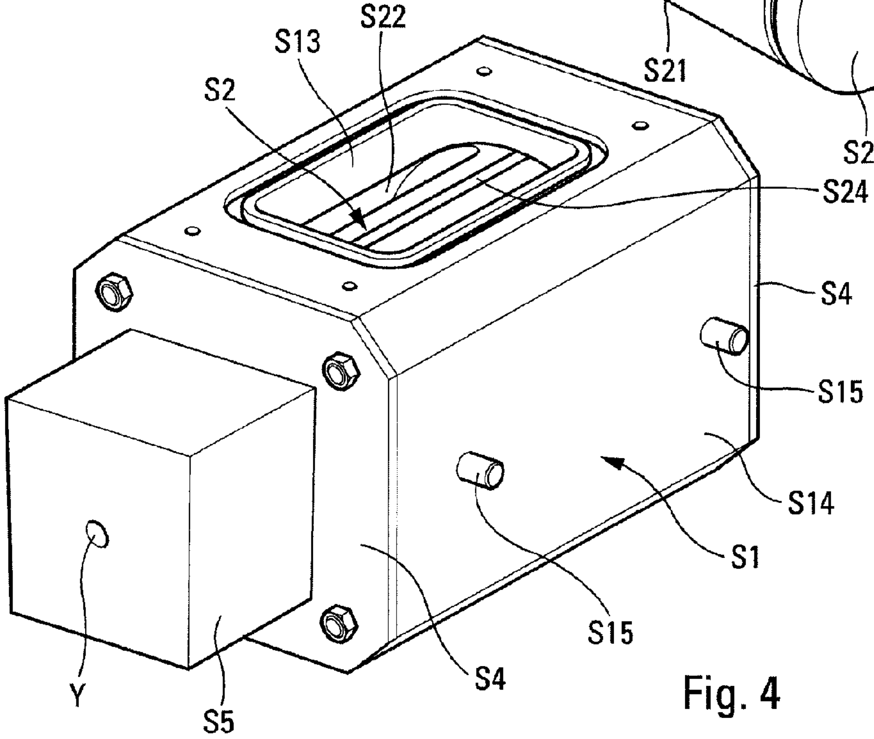
FIG. 4 is a view similar to the view in FIG. 3 showing the air lock in its assembled state.
Figure 6:
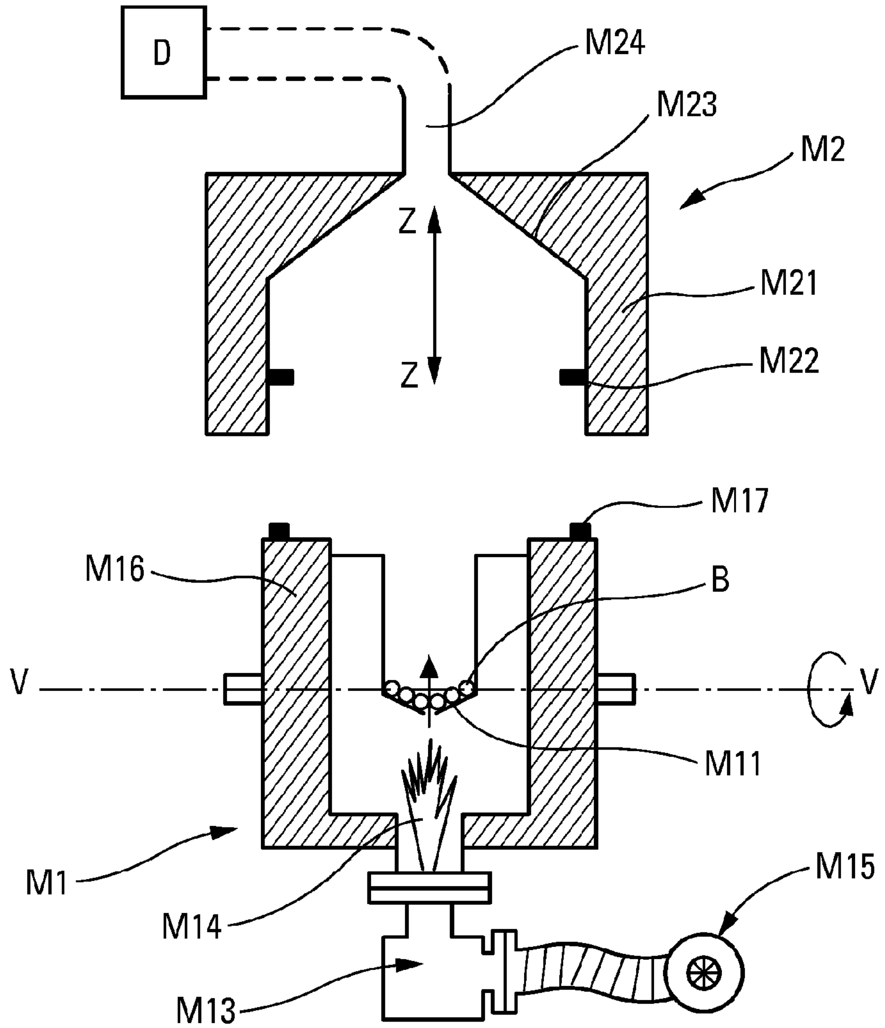
Figure 7:
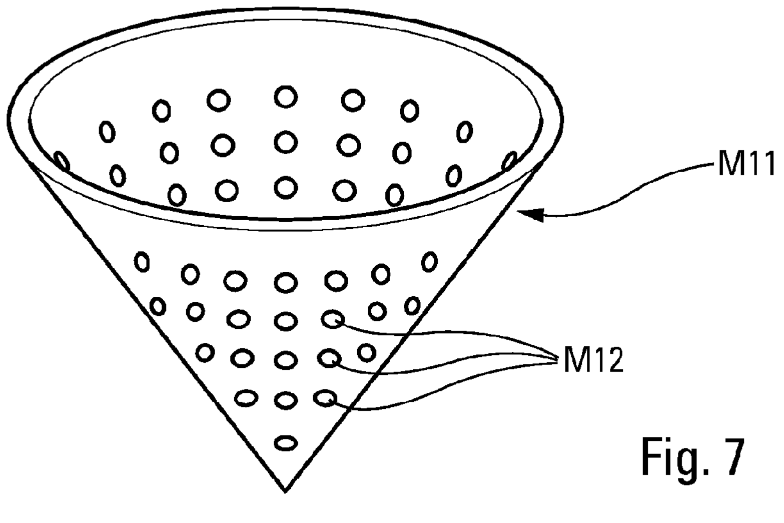

FIGS. 5*a*, 5*b*, 5*c*, and 5*d* are vertical-section views through the air lock of FIGS. 3 and 4 in various drum positions so as to show its operation;

FIG. 6 is a diagrammatic view of another detail of the FIG. 1 installation showing a heating pot; and FIG. 7 is a much larger-scale perspective view of a crucible used in the FIG. 6 heating pot.

The present invention is used in non-limiting manner in an installation for producing pyrolysis gas from organic matter, such as sludge, used tires, food industry waste such as vinasse residue, etc. The installation is shown in very diagrammatic manner in FIG. 1 that is described in detail below.

The core of the installation is a pyrolysis furnace F that is arranged in an airtight chamber E comprising an inlet air lock Si and an outlet air lock So. The pyrolysis furnace F operates on the principle that the organic matter is heat treated at high temperature in an oxygen-free atmosphere. A prior-art installation using such a pyrolysis furnace is described in document WO 2005/018841. The pyrolysis furnace of that document includes a feed screw enabling the organic waste to be treated to advance from one end of the furnace to the other. In order to provide heat, preheated steel balls are used that are inserted into the pyrolysis furnace and follow the same path as the organic waste inside the pyrolysis furnace. The operating principle of that prior-art pyrolysis furnace is adopted in the present invention. Thus, the pyrolysis furnace F also incorporates a feed screw for causing preheated balls and organic matter to advance through the pyrolysis furnace. The physiochemical principles that make it possible to extract pyrolysis gas from organic matter that has been heated in an oxygen-free atmosphere are not described below, given that the principle is described in detail in the above-mentioned document WO 2005/018841. The present invention relates more particularly to those components of the installation that are, to a greater or lesser extent, directly associated with the pyrolysis furnace F, in order to ensure optimum operation of the installation.

Figure 2:
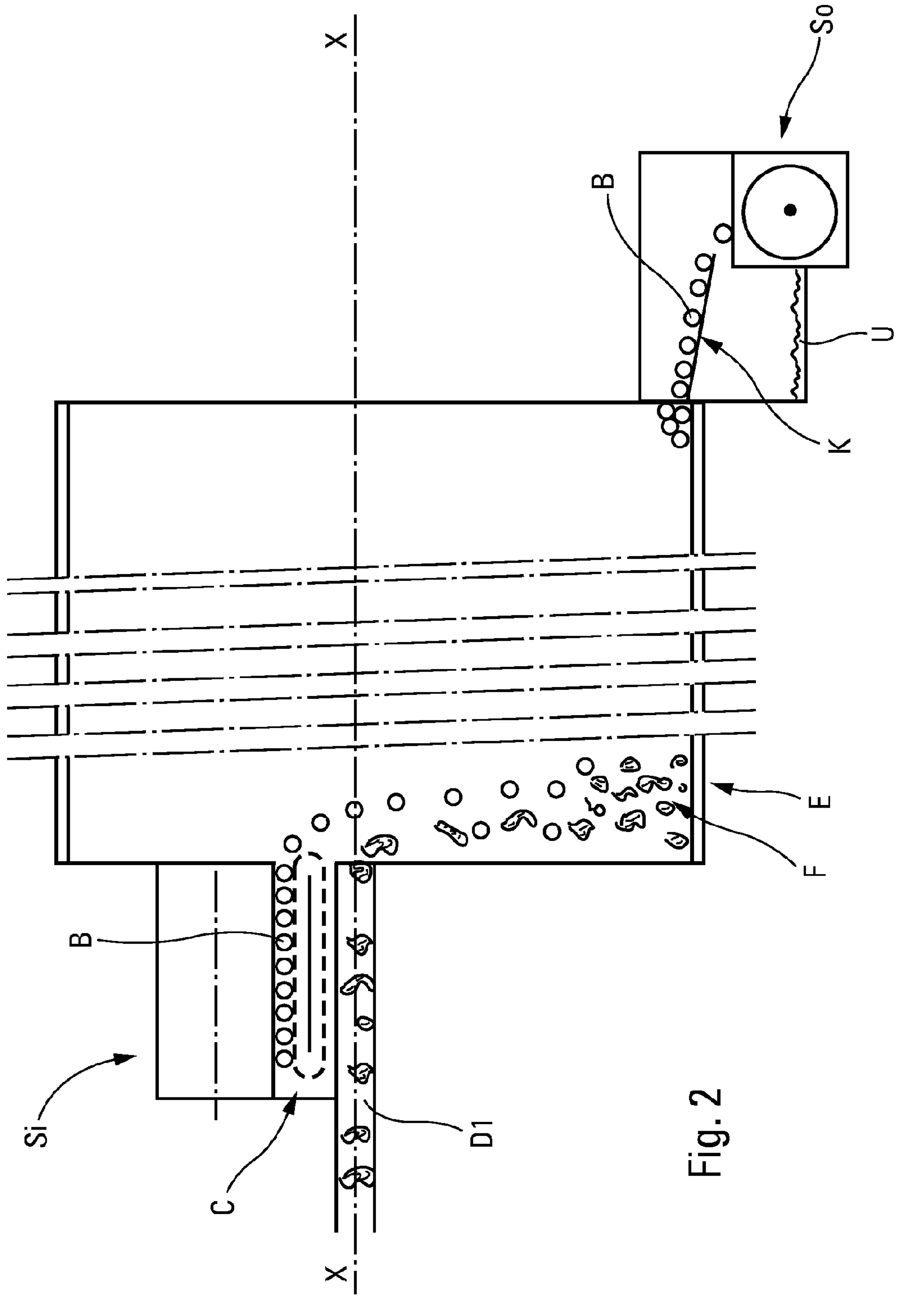
FIG. 2 is a diagrammatic larger-scale view of a portion of the FIG. 1 installation incorporating two air locks of the invention.

Reference is made below to FIG. 2 in which it can be seen that the pyrolysis furnace F, that is shown in truncated manner, turns about a horizontal axis X and receives organic waste that rains down from an axial feed duct D1 and preheated balls B that rain down from a chain conveyor path C. The conveyor path C is in the form of a closed-loop chain that is driven like a crawler track. The preheated balls B arrive on the conveyor path C from the inlet air lock Si. In FIG. 2, it should be observed that the preheated balls B rain down into the furnace F above the organic waste that is fed through the duct D1. In this way, right from entry into the furnace, a homogeneous mixture of organic matter and preheated balls B is obtained, thereby enabling a heat treatment through the rotary pyrolysis furnace F that is more homogeneous and regular. The use of a chain conveyor path arranged above the feed duct D1 of organic matter is a characteristic that may be protected in itself, i.e. independently of the particular structure of the other components of the installation. On leaving the furnace, the cooled balls pass onto a dust remover K over which the balls B advance in such a manner as to lose the pyrolysed-organic-matter dust that is present on their surfaces. By way of example, the dust remover K may be in the form of a sloping grid that is formed of metal cables arranged in parallel. For soundproofing, each cooled ball B rolls between two cables, losing dust as it passes. The dust is collected in a tank U that is arranged below the dust remover K. It should be observed that the use of a dust remover comprising sloping metal cables in parallel is a characteristic that is protectable independently of the other components of the installation, and may be used in other types of installation that need dust to be removed from bodies, such as balls. Finally, the dust-free cooled balls B fall by gravity into the outlet air lock So. The pyrolysis gas leaves the furnace F through a pipe I.

The airtight chamber E is constituted by the furnace F, the inlet air lock Si, the conveyor path C, a fraction of the feed duct D1, the dust remover K, the dust collection tank U, and the outlet air lock So. The feed duct constitutes an inlet for enabling organic matter to enter into the chamber E. The pipe I constitutes an outlet for pyrolysis gas. The inlet air lock Si constitutes a ball inlet and the outlet air lock So constitutes a ball outlet for the chamber E. In the airtight chamber E there exists an oxygen-free atmosphere at a pressure that is less than atmospheric pressure. As a result, the only risk of sudden degradation is an implosion of the furnace or of the chamber, and not an explosion, since the chamber is under suction.

The description below returns to FIG. 1 in order describe the other components of the installation for producing pyrolysis gas. The organic matter that is fed through the duct D1 comes from a reservoir T that contains a large quantity of organic matter. The reservoir T may be connected directly to the feed duct D1. In a variant, a dryer D may be interposed between the reservoir T and the duct D1, as shown in FIG. 1. The dryer D is optional. The gas coming from the dryer D may be evacuated into the atmosphere after prior treatment in a washing tower L. Optionally, a heat exchanger P may be interposed between the dryer D and the washing tower L so as to recover the heat from the gas before washing in the washing tower. The heat exchanger P is also optional. The heat needed for drying the organic matter comes directly from the installation, as described below. Thus, the organic matter coming from the reservoir T reaches the pyrolysis furnace F by passing through the dryer D (optional) and the feed duct D1 that is advantageously situated on the axis X of the pyrolysis furnace F. On leaving the furnace, the solid residues resulting from the treated organic matter are collected in the tank U situated below the dust remover K. In this embodiment, the pyrolysis gas resulting from heat treating the organic matter by means of the preheated balls is conveyed through the pipe I to a boiler H that burns the pyrolysis gas so as to create heat that can be used to feed a radiator circuit R, for example. Although not shown, it is possible to recover the residual heat from the pyrolysis gas in the pipe I through a heat exchanger before conveying said gas to the boiler H. As can be seen in FIG. 1, a fraction of the heat generated by the boiler H is conveyed to the dryer D.

The cooled dust-free balls B leave the outlet air lock So so as to fall onto a connection ramp Q that enables them to be conveyed to an elevator A2 that is provided with a bucket G2 that is vertically movable up and down. The elevator A2 may be provided with a plurality of buckets G2. The purpose of the bucket G2 is to raise a predetermined quantity of balls B to the level of a loading rail M3 on which there moves a carriage M31. The loading rail M3 is arranged horizontally, and advantageously parallel to the axis X of the furnace. The rail M3 with its carriage M31 forms an integral part of the heating system M that includes a plurality of heating modules that are arranged side by side in alignment along an axis V that is advantageously parallel to the axis X of the pyrolysis furnace. Each heating module comprises a heating pot M1 that is arranged below the rail M3, and a cover M2 that is arranged above the corresponding heating pot M1. In FIG. 1, eight heating modules of this type can be seen. The fine structure of a heating module is described in detail below. Thus, the cooled balls coming from the ramp Q and from the elevator A2 are emptied into the carriage M31 which in turn empties its contents into the heating pots M1. The carriage M31 moves away, and the cover M2 descends onto the heating pot M1 so as to close it. The balls are then heated inside the heating pot M1 to a predetermined temperature. After that, the cover M2 is raised and the heating pot M1 tilts about the pivot axis V so as to empty its contents into an unloading carriage M41 that is movable along a horizontal rail M4 that is arranged below the row of heating pots M1, as can be seen in FIG. 1. This quantity of heated balls is then conveyed by the unloading carriage M41 that empties them directly into the inlet air lock Si, so as to follow the path described above with reference to FIG. 2. In a variant, the carriage M41 empties the balls into an elevator A1 that includes a bucket G1 that is vertically movable up and down, in similar manner to the bucket G2. The heated balls contained in the bucket G1 are emptied into the inlet air lock Si. The ball cycle is thus a closed loop. In order to power the heating pots, a gas source G may be provided.

The pots M1 and thus filled, heated, and emptied sequentially so as to feed the pyrolysis furnace F in regular manner with a constant sequential flow. For example, a first pot is filled and heating started. The second pot is then filled and heating started. When the first pot has finished heating, the third pot may be filled and heating started. Then, the first pot may be emptied, while the second has finished heating, and the fourth is filled and heating started. And so on. The pot cycles overlap so as to obtain a flow of heated balls that is substantially regular and constant. Naturally, the operation of the pots requires accurate and reliable synchronization or sequencing.

It should be observed that the installation for producing pyrolysis gas is particularly compact and takes up a very small amount of floor space. This results from the heating system M being arranged above and parallel to the chamber E containing the pyrolysis furnace F. These two superposed macro-components are bordered at either end by the elevators A1 and A2. The boiler H, the radiator system R, the organic-matter reservoir T, the dryer D, the washing tower L, and the exchanger P may be offset, since they are connected together only by ducts, pipes, and/or tubes.

It should also be observed that the balls are heated outside the airtight chamber E that is defined by the inlet air lock Si and the outlet air lock So. The elevators A1, A2 the ramp Q, and the heating system M are situated outside the chamber. The superposed arrangement of the chamber E and of the heating system M is a characteristic that may also be protected in itself, i.e. independently of the structure of the other components of the installation.

A particularly advantageous component of the installation is constituted by the inlet and outlet air locks Si, So, the design of which is described in detail below. The inlet air lock Si may have strictly the same design as the outlet air lock So. However, as can be seen in FIG. 1, the inlet air lock Si is arranged parallel to the axis X of the furnace F, while the outlet air lock So is arranged perpendicularly to the axis X of the furnace F. Apart from this difference in arrangement, the two air locks are identical. Consequently, with reference to FIGS. 3 to 5*d*, reference is made just to an air lock, in order to illustrate the design and the operation of both air locks.

The air lock shown in exploded view in FIG. 3 comprises a stationary cage S1 for receiving a rotary drum S2. In other words, The rotary drum S2 is capable of turning inside the stationary cage S1 about its own longitudinal axis Y. The stationary cage S1 comprises a top face S11 formed with a loading top opening S13, a bottom face S18 formed with an unloading bottom opening S19, two side faces S14, one of which is provided with two evacuation ducts S15, and two end faces S16, each forming a mounting opening S17. The stationary cage S1 is hollow in such a manner as to define a hollow inside S10 that is of generally substantially cylindrical shape. The hollow inside S10 communicates with the outside through the top and bottom openings S13, S19, and the two mounting openings S17. By way of example, the stationary cage S1 may be made by machining a block of stainless steel, or by molding.

The rotary drum S2 presents a generally substantially cylindrical configuration that is adapted to be inserted, with limited clearance, into the hollow inside S10 of the stationary cage S1. The rotary drum S2 comprises a cylindrical body S21 that defines a hollow inside S20 that communicates with the outside through a window S22. The two ends of the body S21 are provided with two flanges S23 that close the ends of the cylindrical body. It should be observed that the outer surface of the body S21 is formed with a network of grooves S24, S25 for receiving dynamic sealing gaskets S31 and S32. By way of example, the gaskets may be made of graphite-containing ceramic braid. On the body S21, there are four axial rectilinear grooves S24 that are uniformly distributed angularly, and two toroidal annular grooves S25 centered on the axis Y. The ends of the rectilinear gaskets S31 come into contact with the two toroidal gaskets S32. Although not shown in FIG. 3, the arrangement of the gaskets in the grooves S24 and S25 can be easily understood. The function of the dynamic sealing gaskets is to slide in sealing manner inside the stationary cage S1, so as to prevent any direct communication between the loading top opening S13 and the unloading bottom opening S19 of the stationary cage S1.

In the assembled state as shown in FIG. 4, the two end faces S16 of the stationary cage S1 are closed by plates S4 that are bolted on the stationary cage S1. A drive motor S5 is mounted on the plate S4 so as to turn the rotary drum S2 inside the stationary cage S1 about its axis Y. Through the loading top opening S13, it is possible to see the rotary drum S2 and even its window S22. It is also possible to observe the two evacuation ducts S15 that may be connected to respective vacuum pumps.

Figure 5A:
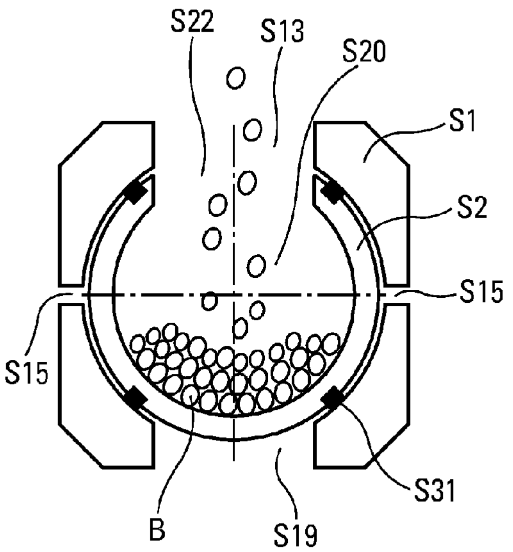
Figure 5B:
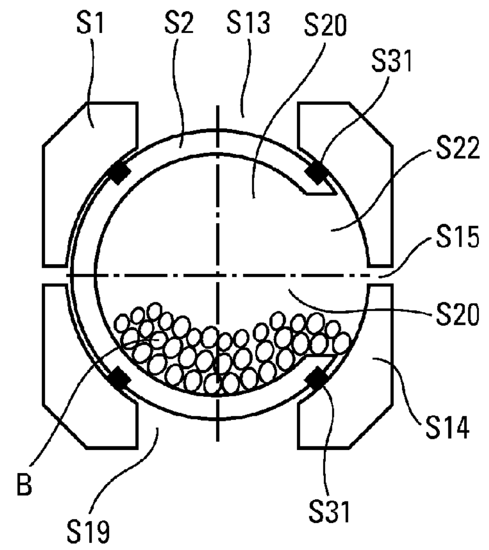
Figure 5C:
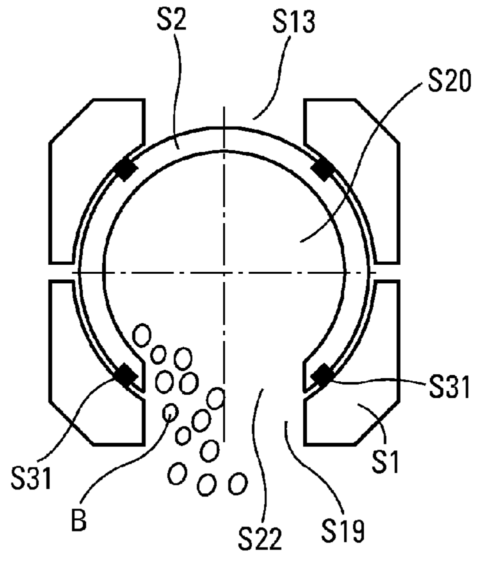
Figure 5D:
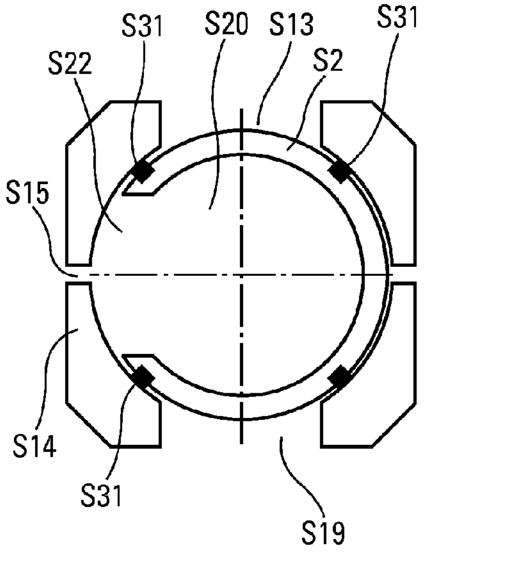

Reference is made below to FIGS. 5*a* to 5*d* in order to describe a complete operating cycle of the air lock shown in FIGS. 3 and 4. In FIG. 5*a*, the window S22 of the rotary drum S2 is arranged in alignment with (or facing) the loading top opening S13 of the stationary cage S1. Any communication between the top opening S13 and the unloading bottom opening S19 is prevented by the dynamic sealing gaskets S31, S32 mounted on the rotary drum S2 and coming into sealing rubbing contact with the inside of the stationary cage S1. In this configuration, matter such as balls B can be inserted into the rotary drum S2. Such insertion may be performed merely by gravity. Once the desired quantity of balls have been loaded into the air lock, the rotary drum S2 turns through one-fourth of a turn in the clockwise direction so as to arrive in the configuration shown in FIG. 5*b*. The inside S20 of the rotary drum S2 with its balls B is thus isolated from the outside, and more particularly from the top and bottom openings S13, S19 by the four rectilinear sealing gaskets S31 and by the two toroidal gaskets S32. The window S2 faces towards the side face S14 of the stationary cage that forms an evacuation duct S15, such that the content of the drum may be emptied of the gas that it contains, which, for the above-described application, may be outside air or pyrolysis gas. Finally, the rotary drum S2 contains only balls B. By continuing to turn the drum S2 inside the cage in the clockwise direction through one-fourth of a turn, the configuration shown in FIG. 5*c* is reached. The window S22 is thus oriented downwards facing the unloading bottom opening S19. The balls B may thus leave the drum S2, merely by gravity. Once again, it should be observed that the gaskets S31 and the annular gaskets S32 (not shown) prevent any communication between the loading top opening S13 and the unloading bottom opening S19. Once the balls have been discharged, the hollow inside S20 of the drum S2 is full of a gas that may be outside air or pyrolysis gas. By once again causing the drum S2 to turn through one-fourth of a turn in the clockwise direction, the configuration shown in FIG. 5*d* is reached. The window S22 is thus oriented towards the side face S14 of the stationary cage S1 in which the other evacuation duct S15 is formed. It is thus possible to evacuate the inside of the drum by means of a vacuum pump. The drum S2 may then continue to turn so as to arrive once again in the configuration shown in FIG. 5*a*, ready to be loaded once again with balls. A complete operating cycle is thus terminated.

In FIG. 4, the two evacuation ducts S15 are situated on the same side face S14, whereas in the diagrammatic drawings of FIGS. 5*a* to 5*d*, each side face S14 is provided with a respective evacuation duct S15. This difference is very minor and does not modify in any way the operation of the air lock. When the two evacuation ducts S15 are situated on the same side face, as shown in FIG. 4, the turning movement of the drum S2 inside the cage S1 is thus performed backwards and forwards between the configuration in FIG. 5*a* and the configuration in FIG. 5*c*. This too is a minor operating detail.

It should be observed that the window S22 presents an elongate configuration in the direction of the axis Y, as do the two openings S13 and S19. This makes it possible to discharge the contents of the air lock in the form of a line or an elongate strip, and not in the form of a substantially pyramid-shaped pile. This characteristic is particularly advantageous when the air lock is used as an inlet air lock Si that is associated with a chain conveyor path C on which the balls are to be deposited linearly. This characteristic (elongate window) is also advantageous in the outlet air lock So where the cooled balls B arrive across the entire width of the dust remover K.

In addition, the design itself of the air lock, namely a rotary drum inside a stationary cage, enables it to withstand temperature and pressure conditions that are particularly demanding, which is the situation in the airtight chamber E. The balls arrive in the inlet air lock Si with a temperature that is very high, and leave the outlet air lock So with a temperature that is lower, but nevertheless relatively high. As a result of the rotary design of the air lock, it is not very sensitive to thermal expansion phenomena which are absorbed completely by the dynamic sealing gaskets. The air lock is also very good at withstanding any suction that exists inside the chamber E. As a result of the rotary design of the air lock, suction does not generate a pressure force acting directly on the operation of the air lock. In other words, the rotary drum S2 can turn inside the stationary cage regardless of the pressure that exists inside the chamber.

The above-described air lock may be used equally well both as an inlet air lock and as an outlet air lock in any installation that includes an airtight chamber having inlet and outlet flows that are to be controlled with accuracy. Thus, the air lock is not associated directly with the above-described installation for producing pyrolysis gas.

The heating system for heating balls M for the installation for producing pyrolysis gas also incorporates particularly beneficial and advantageous characteristics that are described below with reference to FIGS. 6 and 7. As described above, the heating system includes a plurality of heating modules, each comprising a heating pot M1 and a cover M2. The pot M1 and the cover M2 are capable of moving mutually relative to each other in translation along a vertical axis Z. For practical reasons, it is easier to move the cover M2 relative to the pot M1 that remains stationary in translation. However, the pot M1 may be pivotally mounted by pivoting about a pivot axis V. By pivoting about the axis V, the contents of the pot M1 may be emptied.

The pot M1 includes a crucible M11 arranged in an insulating jacket M16 that supports a burner M13. The burner M13, that may be a gas burner, produces a flame M14 inside the jacket M16 below the crucible M11 so as to heat it. A predetermined quantity of balls B has been emptied beforehand into the crucible M11 by the loading carriage M31. In this way, the balls B are heated inside the crucible M11 by the flame M14 produced by the burner M13. Advantageously, as shown in FIG. 7, the crucible M11 is provided with a plurality of through holes M12 through which the flame M14 of the burner M13 may pass so as to come into direct contact with the balls B situated in the crucible M11. In an advantageous embodiment, the crucible M11 presents a conical shape and may be made from a sheet of stainless steel that is cut and then deformed into a cone. Rapid and uniform heating of the balls is thus obtained inside the crucible M11 given that the flame M14 can propagate in the gaps present between the balls. In order to improve the propagation of the flame M14, the heating pot M1 may also be provided with a bellows M15 that is adapted to drive a flow of air that tends to urge the flame M14 towards the crucible M11 and through the through holes M12. The hot driven flow of air passes directly through the quantity of balls present in the crucible M11 and heats them in rapid and uniform manner.

The first function of the cover M2 is to close the crucible M11 during the heating stage. Thus, a minimum quantity of heat dissipates into the atmosphere. As a result, the balls are heated even more rapidly and more uniformly. In order to guarantee complete sealing between the cover M2 and the pot M1, it is possible to provide toroidal sealing gaskets M17 and M22. The second function of the cover M2 is to collect and to evacuate the hot gas from the crucible. To do this, the cover M2 forms a converging hood M23 that is extended by an evacuation duct M24. By way of example, the hot gas may be conveyed through a tube J to the dryer D, as can be seen in FIG. 1. Naturally, other applications for the evacuated hot gas can be envisaged.

Such a heating module finds an advantageous application in the above-described installation for producing pyrolysis gas. However, such a heating module can be used in other installations that need to heat solid manner, such as balls, rapidly and uniformly, without seeking to melt them.

By means of the invention, as a result of the particular design of the air locks and of the heating modules, the installation for producing pyrolysis gas is optimized.

The invention claimed is:

1. An installation for producing pyrolysis gas from organic matter, said installation comprising:

- a pyrolysis furnace that operates without oxygen and with preheated solid matter;
- a heating system for heating the solid matter, the heating system comprising a plurality of modules, each module comprising:

a heating pot comprising a crucible for receiving the solid matter, and a burner for heating the crucible and the solid matter; and a cover mounted in removable manner on the heating pot so as to close the crucible;

wherein the modules are arranged side by side, the heating pots being mounted to pivot about a common horizontal axis, each pot pivoting in independent manner;

the heating system further comprising a loading rail for loading the solid matter to be heated, said loading rail arranged above the pots and provided with a loading carriage for loading crucibles, and an unloading rail for unloading the solid matter, said unloading rail arranged below the pots and provided with an unloading carriage for unloading crucibles, the modules and the carriages being actuated in sequential manner so as to deliver the solid matter with a regular sequential flow; and a conveyor system for conveying the solid matter from the heating system to the pyrolysis furnace, and the solid matter from the pyrolysis furnace to the heating system.

2. The module according to claim 1, wherein the crucible is provided with through holes so as to convey heat from the burner into the crucible and through the solid matter to be heated.

3. The module according to claim 2, wherein the crucible is frustoconical and includes a plurality of the through holes.

4. The module according to claim 2, wherein the heating pot further includes a bellows so as to create a flow of air that is heated by the burner and that flows through the through holes of the crucible and through the solid matter to be heated.

5. The module according to claim 1, wherein the cover includes an evacuation duct for evacuating the hot gas from the crucible.

6. The module according to claim 1, wherein the heating pot is mounted to pivot about a horizontal axis, and the cover is movable in translation along a vertical axis.

7. The installation according to claim 1, wherein the heating system is positioned above the pyrolysis furnace, the conveyor system including elevators that are provided with buckets that are vertically movable up and down.

8. The installation according to claim 1, wherein the pyrolysis furnace is placed in an airtight chamber that is provided with an organic-matter inlet and a pyrolysis-gas outlet, and with a solid matter inlet and a solid matter outlet, at least one of the solid matter inlet or solid matter outlet being fitted with an air lock comprising:

a stationary cage that is provided with two openings that are arranged in opposite manner, namely a loading top opening and an unloading bottom opening; and a rotary drum that is mounted to turn about an axis of the rotary drum inside the cage, the rotary drum including a window that can be selectively positioned to face one of the openings of the stationary cage so as to load and unload the solid matter from/into the air lock.

9. The installation according to claim 1, wherein the solid matter is in the form of balls.

10. The installation according to claim 1, wherein the solid matter is in the form of granules.

11. The installation according to claim 1, wherein the solid matter is in the form of solid bodies.

* * * * *